United States Patent
Bardaweel et al.

(10) Patent No.: US 11,362,575 B1
(45) Date of Patent: Jun. 14, 2022

(54) SPRING ASSISTED MAGNETIC ENERGY HARVESTER

(71) Applicant: Louisiana Tech Research Corporation, Ruston, LA (US)

(72) Inventors: Hamzeh Bardaweel, Ruston, LA (US); Ghufran Aldawood, Ruston, LA (US); Hieu Tri Nguyen, Ruston, LA (US)

(73) Assignee: Louisiana Tech Research Corporation, Ruston, LA (US)

( * ) Notice: Subject to any disclaimer, the term of this patent is extended or adjusted under 35 U.S.C. 154(b) by 162 days.

(21) Appl. No.: 17/003,282

(22) Filed: Aug. 26, 2020

Related U.S. Application Data (60) Provisional application No. 62/892,311, filed on Aug. 27, 2019.

(51) Int. Cl.
*H02K 35/02* (2006.01)
*H04Q 9/00* (2006.01)

(52) U.S. Cl.
CPC ............... *H02K 35/02* (2013.01); *H04Q 9/00* (2013.01); *H04Q 2209/40* (2013.01); *H04Q 2209/886* (2013.01)

(58) Field of Classification Search
CPC ...... H02K 35/02; H04Q 9/00; H04Q 2209/40; H04Q 2209/886; H01F 7/0236; H01F 7/0242; H01F 7/0247; H01F 7/0205; H01F 7/0231; H01F 7/0268; H01F 7/0273; H01F 7/0289; H01F 7/0294

See application file for complete search history.

(56) References Cited

U.S. PATENT DOCUMENTS

| | | | | |
|---|---|---|---|---|
| 2004/0251750 A1* | 12/2004 | Cheung | .................. | H02K 35/02 310/23 |
| 2008/0174188 A1* | 7/2008 | Cederwall | .............. | H02K 35/02 310/36 |
| 2012/0104877 A1* | 5/2012 | Isaacs | .................... | H02K 35/02 310/30 |
| 2015/0187480 A1* | 7/2015 | Chaizy | .................. | H01F 7/0263 403/66 |

OTHER PUBLICATIONS

Gao, Mingyuan, et al. "Experimental investigation of non-linear multi-stable electromagnetic-induction energy harvesting mechanism by magnetic levitation oscillation." Applied Energy 220 (2018): 856-875.

(Continued)

*Primary Examiner* — Sisay Yacob
(74) *Attorney, Agent, or Firm* — Jones Walker LLP (57) ABSTRACT

A magnetic spring based energy harvester which includes a casing and a first retained magnet and a second retained magnet positioned within the casing. A levitated magnet is positioned between the first and second retained magnets and a spring assembly connected to the casing and the second retained magnet, wherein the spring assembly is configured to allow limited movement of the second retained magnet toward and away from the levitating magnet. Lastly, a conductive coil winding is positioned around the levitated magnet such that movement of the levitated magnet induces a current in the coil winding.

20 Claims, 6 Drawing Sheets

(56) References Cited

OTHER PUBLICATIONS

Aldawood, Ghufran, Hieu Tri Nguyen, and Hamzeh Bardaweel. "High power density spring-assisted nonlinear electromagnetic vibration energy harvester for low base-accelerations " Applied Energy 253 (2019): 113546.

Podder, Pranay, et al. "Magnetic tuning of nonlinear MEMS electromagnetic vibration energy harvester." Journal of Microelectromechanical Systems 26.3 (2017): 539-549.

Mammari, Abdullah, and Hamzeh Bardaweel. "Design enhancement and non-dimensional analysis of magnetically-evitated non-linear vibration energy harvesters." Journal of Intelligent Material Systems and Structures 28.19 (2017) 2810-2822.

Mammari, Abdullah, et al. "Fabrication and characterization of non-resonant magneto-mechanical low-frequency vibration energy harvester" Mechanical Systems and Signal Processing 102 (2018): 298-311.

\* cited by examiner

SPRING ASSISTED MAGNETIC ENERGY HARVESTER

CROSS REFERENCE TO RELATED APPLICATION

This application claims the benefit under 35 USC § 119(e) to U.S. Provisional Application Ser. No. 62/892,311 filed Aug. 27, 2019, which is incorporated by reference herein in its entirety.

BACKGROUND OF INVENTION

Figure 1A:
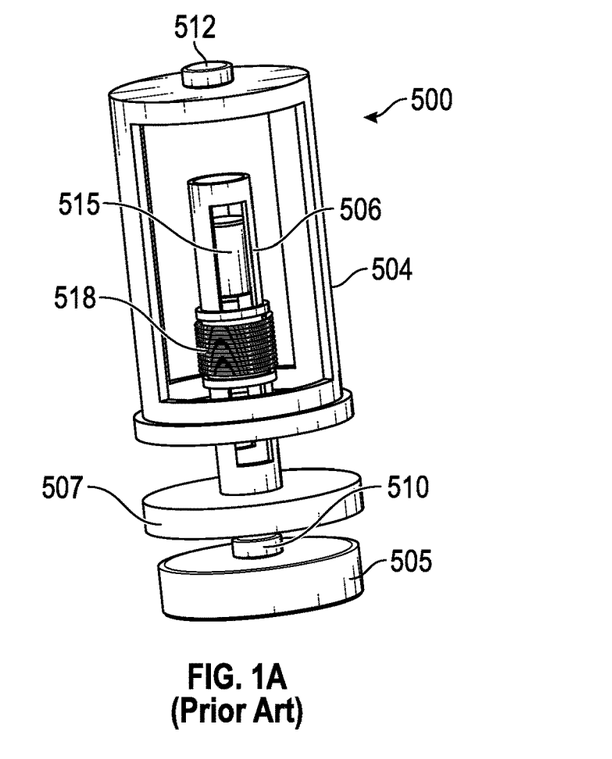
FIG. 1A is a perspective view of a first prior art energy harvester.

Energy harvesting systems that convert kinetic energy from vibrations into useful electric power using piezoelectric, electromagnetic, or electro-static elements are known in the art. One commonly employed energy harvester design is the magnetic spring based energy harvester such as seen in the exploded view of FIG. 1A. This magnetic spring based energy harvester 500 consists of two (top 512 and bottom 510) fixed magnets with a third "levitated" magnet 515 between the first two magnets. These magnets are arranged in a repulsive configuration with like poles facing each other. The repulsive magnetic force developed between the levitated and stationary fixed magnets displays a nonlinear stiffness behavior and produces a broad frequency response. Moreover, these magnetic spring based harvesters are characterized by their low output impedances. This ensures that the electric currents produced can meet the electric current threshold required to operate low-power sensors. Additionally, the mass of the levitated magnet in the harvester reduces its resonant frequency which further enables low frequency operation.

Figure 1B:
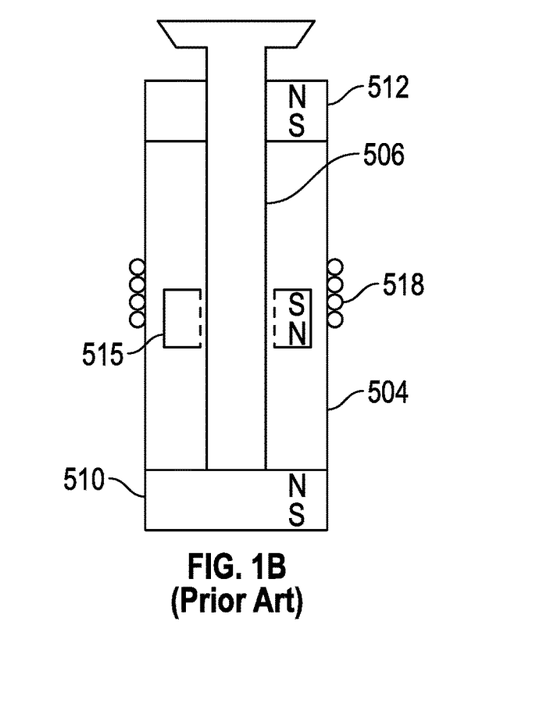
FIG. 1B is a planar cross-sectional view of a second prior art energy harvester.

An alternate prior art version of this concept is seen in FIG. 1B. Here, the magnet guide 506 is a rod and the magnets are toroidal or "donut" shaped with the rod extending through the magnets. The conductive coil winding 518 is positioned on the outside of casing 504. However, the FIG. 1B energy harvester otherwise operates in the same manner as that seen in FIG. 1A.

SUMMARY OF SELECTED EMBODIMENTS

One embodiment of the invention is a method of monitoring a vehicle traffic structure, the method comprising the step of positioning a plurality of self-powered vibration sensor units along the vehicle traffic structure. Each of the self-powered vibration sensor units will have a power generator/harvester which includes (i) a casing; (ii) a magnet guide positioned within the casing; (iii) a first retained magnet on one end of the magnet guide; (iv) a second retained magnet on an opposite end of the magnetic guide, wherein the second retained magnet retained in place by a spring assembly allowing movement of the second retained magnet away and toward the magnet guide; (v) a levitated magnet positioned within the magnet guide; (vi) a first conductive coil winding circumscribing the magnet guide; and (vii) a second conductive coil winding at least partially circumscribing the second retained magnet. A sensor element is positioned to receive power directly or indirectly from the generator/harvester and detect vibration in the traffic structure. A controller is configured to receive power directly or indirectly from the generator/harvester and receive data from the sensor element. A wireless transmitter is configured to receive sensor data from the controller.

Another embodiment of the invention is a magnetic spring based energy harvester which includes a casing and a first retained magnet and a second retained magnet positioned within the casing. A levitated magnet is positioned between the first and second retained magnets and a spring assembly connected to the casing and the second retained magnet, wherein the spring assembly is configured to allow limited movement of the second retained magnet toward and away from the levitating magnet. Lastly, a conductive coil winding is positioned around the levitated magnet such that movement of the levitated magnet induces a current in the coil winding.

It will be understood that the embodiments described above or in the below Detailed Description are merely illustrative and that the scope of the invention is to be defined solely by the appended claims when accorded a full range of equivalents, variations and modifications available to those skilled in the art.

DETAILED DESCRIPTION OF SELECTED EMBODIMENTS

Figure 2:
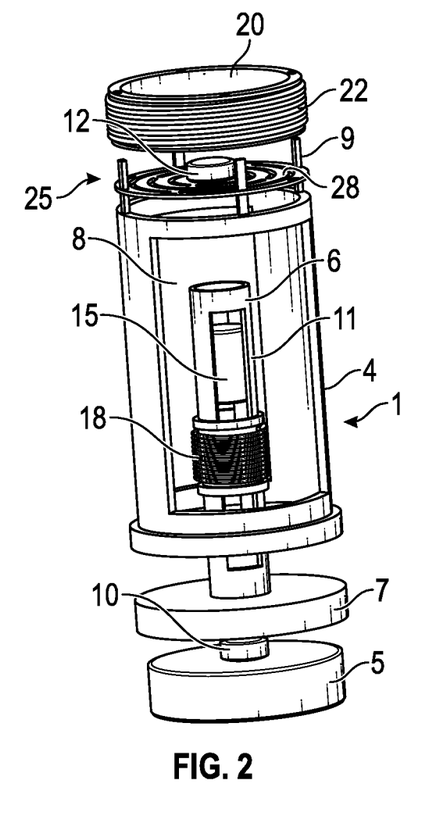
FIG. 2 is an exploded perspective view of one embodiment of an energy harvester of the present invention.
Figure 3:
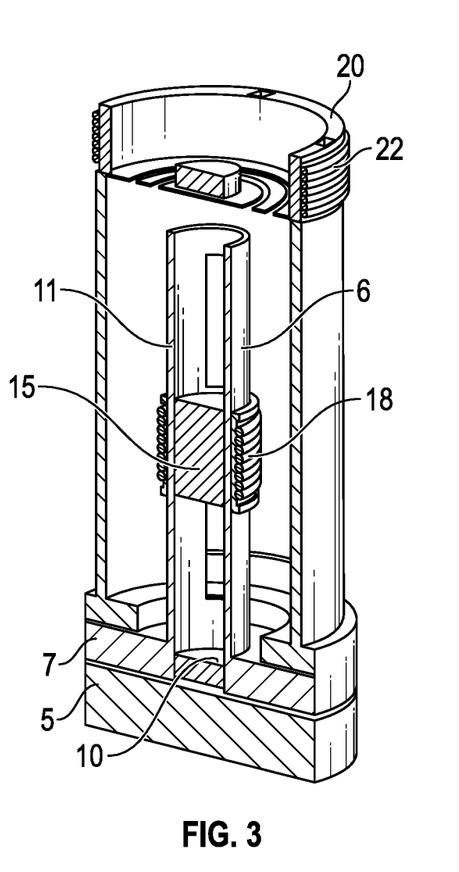
FIG. 3 is an assembled perspective cross-sectional view of the FIG. 2 embodiment.
Figure 4:
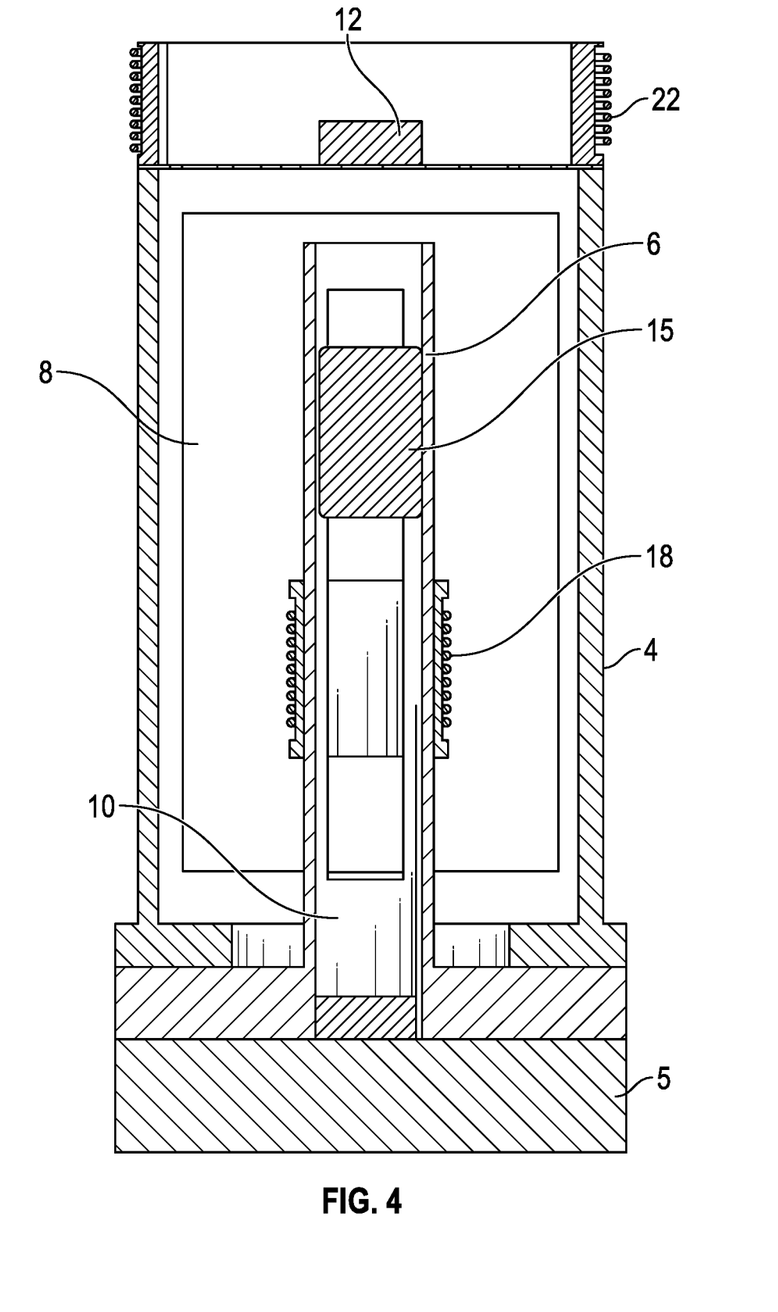
FIG. 4 a planar cross-sectional view of the FIG. 2 embodiment.

FIGS. 2 through 4 illustrate one embodiment of the magnetic spring based energy harvester 1 of the present invention. In the exploded view of FIG. 2, it can be seen the energy harvester 1 is generally formed of a cylindrically shaped housing or "casing" 4 having open top and bottom sections. The illustrated embodiment of casing 4 also includes open window sections 8 allowing observation of the energy harvester's function, but in other embodiments, the casing 4 would be largely enclosed to protect the internal area from the environment. Naturally, the casing could take on shapes other than a cylinder. A magnet guide 6 is positioned inside the casing 4. In the illustrated embodiment the magnet guide 6 is a cylindrical tube 11 fixed upon a guide base 7. Preferred embodiments of magnet guide 6 may remove sidewall sections of cylindrical tube 11 to conserve weight and materials. As best seen in the assembled view of FIG. 3, guide base 7 will be retained between the sidewall of casing 4 and casing bottom 5, with these parts being assembled and held together by any convention method such as by adhesives, screws, polymer welding techniques.

The magnet guide cylindrical tube 11 is sized (and its cross-section shaped) to accommodate the levitating magnet 15. The space tolerance between the inside diameter of cylindrical tube 11 and levitating magnet 15 will be sufficient to allow free (frictionless) travel of the levitating magnet within the tube, but tight enough to avoid excessive lateral movement of the magnet. A conductive coil winding 18 is formed around the outer surface of cylindrical tube 11 at a location along the tube where levitating magnet 15 is expected to levitate and travel (i.e., oscillate). The height of the coil winding will typically be between about 75% and 125% the height of the levitating magnet 15, but could also be outside this range in specialized embodiments. The energy harvester will normally be configured such that at least a portion of the levitating magnet will remain within the conductive coil winding when the magnet travels (oscillates) due to vibratory input. The oscillating range of levitating magnet 15 need not remain entirely within the coil winding, but power harvesting efficiency is enhanced when this is the case. More preferred embodiments will be configured such that the travel range of the levitating magnet maintains at least 80% of the levitating magnet within the first conductive coil winding. In one example, the coil winding is formed from 40 AWG copper wire, but of course could be formed of other conductive wire material. Although FIGS. 2 to 4 show the coil within the casing 4, other embodiments could include the coil windings on the outside of the casing as suggested in FIG. 1B. When this disclosure describes a conductive coil winding "circumscribing" a magnet (or magnet guide), it means the coil winding is positioned around or adjacent to the magnet in some manner such that movement of the magnet induces a current in the coil winding. The magnet's movement may be entirely within the winding or only partially within the winding.

At or near one end of the magnet guide 6 (e.g., the "bottom" end in the orientation of the Figures, but also referred to as a "first" end) is a bottom or first retained magnet 10. The bottom retained magnet 10 will be fixed or substantially fixed in place. "Substantially" fixed in place means capable of moving only a small amount compared to the levitating magnet's range of travel. When placed at the "bottom" of the magnet guide, the bottom magnet 10 only need be "fixed" or "retained" in the sense that the magnet cannot move further downward. The bottom magnet 10 could be unrestrained against upward movement and simply rely on gravity and the force of levitating magnet 15 to keep bottom magnet 10 from moving away from its bottom location. At or near the opposing end of magnetic guide 6 (e.g., the "top" end in the orientation of the Figures, but also referred to as a "second" end) is a top or second retained magnet 12. This top retained magnet is secured in its location by a spring assembly 25. The terms "top" and "bottom" are more appropriate when the cylindrical casing 4 is oriented vertically with respect to the direction of gravitational force. However, "first" and "second" ends is more descriptive where the casing is oriented differently, e.g., sideways or perpendicular to the direction of gravitational force. Also, in certain embodiments, the term "casing" may be considered broadly to include all components housing the magnets. For example, the "casing" may include casing 4, casing base 5, and coil spool 20.

Figure 5A:
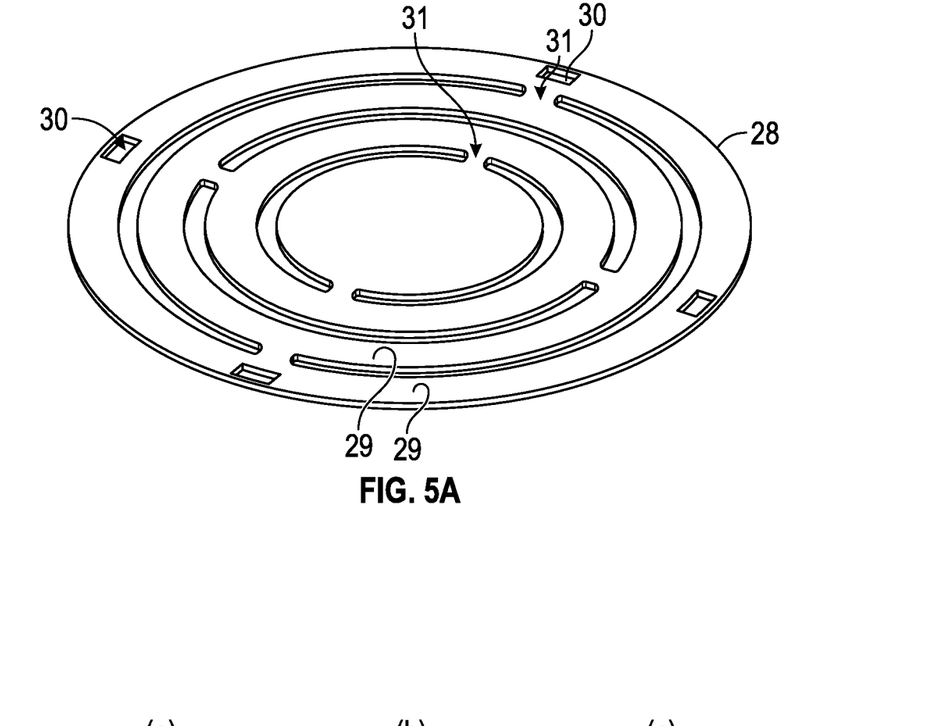
FIG. 5A is a perspective view of one embodiment of the spring assembly used in the FIG. 2 embodiment.

In the illustrated embodiment, spring assembly 25 is a planar type spring 28 and in particular embodiments, can be formed of a glass fiber epoxy laminate. Typically, the top retained magnet 12 will be attached to planar spring 28 by a suitable adhesive. FIG. 5A suggests how this embodiment of planar spring 28 is formed by a series of concentric ring sections 29 which are connected by alternating bridge sections 31. The bridge sections 31 are "alternating" in the sense that the outer ring section 29 is connected to the second inner ring section by bridge sections at 12 o'clock and 6 o'clock positions. On the other hand, the second inner ring section is connected to the third inner ring section by bridge sections at 9 o'clock and 3 o'clock positions. It will be understood that this form a planar spring has at least two concentric discs of material with at least two attachment points connecting the discs, but a majority of a shared circumference between the concentric discs remains unattached.

Figure 5B:
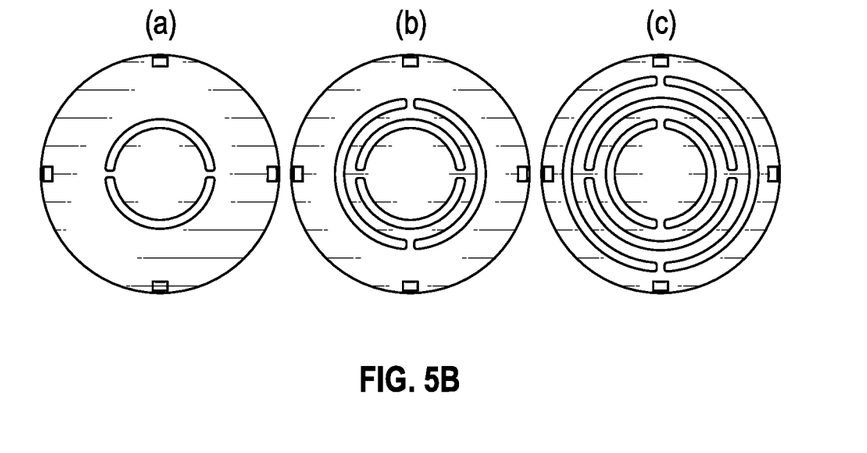
FIG. 5B are planar views of three embodiments of the spring assembly.

The "stiffness" or spring constant of this type of planar spring may be adjusted by changing the number and thickness of the concentric rings making up the planar spring. For example, in FIG. 5B, the spring shown at (a) would have the highest spring constant, the spring shown at (b) a lower spring constant, and the spring shown at (c) the lowest spring constant (of course assuming the same material and material thickness in the dimension perpendicular to the page of FIG. 5B). FIG. 5A also illustrates the anchor apertures 30 on planar spring 28. As suggested in FIG. 2, the anchor apertures 30 will engage the guide arms 9 extending upward from casing 4 and these guide arms will assisting in securing planar spring 28 in its position at the top of casing 4.

In many embodiments, the spring assembly 25 will have a spring constant of between about 200 and 455 N/m when the top retained magnet is oscillating between a frequency of between 1 and 10 Hz and an acceleration of between 0.1 and 1.0 g (i.e., "g" being the acceleration due to Earth's gravity—9.8 m/s$^2$). The spring assembly can be any conventional or future developed spring system, not only the planar springs seen in the Figures. For example, the spring assembly 25 could be formed by a series of coil springs stretching from the inner casing wall and attaching directly the to the top retained magnet 12. In many embodiments, the top and bottom restrained magnets may be considered "mechanically" retained since their vertical movement is limited by physical attachment to some section of the overall harvester casing or spring assembly. This mechanical restraint is distinguished from the merely magnetic forces which constrain the travel of levitating magnet 15. In one embodiment, the magnets can be neodymium iron boron (NdFeB) solid magnets, but other magnets (typically permanent magnets) could be employed. Similarly, in many embodiments, levitating magnet will have a mass between about 2 and 6 times, more preferably 3 and 5 times, (and most preferably about 4 times) that of the top and bottom retained magnets.

The guide arms 9 will also engage the coil spool 20 and help secure the coil spool 20 to the top of casing 4. The coil spool 20 will provide the surface which supports the upper or second conductive coil winding 22. As explained in more detail below, second coil windings 22 will act as a sensor in certain preferred embodiments. The second coil winding 22 may also have a height between about 75% and 125% the height of top retained magnet 12, but could also have a height outside this range. The energy harvester will normally be configured such that at least a portion of the top retained magnet will remain within the second conductive coil winding when the magnet travels (oscillates) due to vibratory input. More preferred embodiments will be configured such that the travel range of the second retained magnet maintains at least 80% of the levitating magnet within the second conductive coil winding. In one example, the coil winding is formed from 40 AWG copper wire, but of course could be formed of other conductive wire material.

Figure 6:
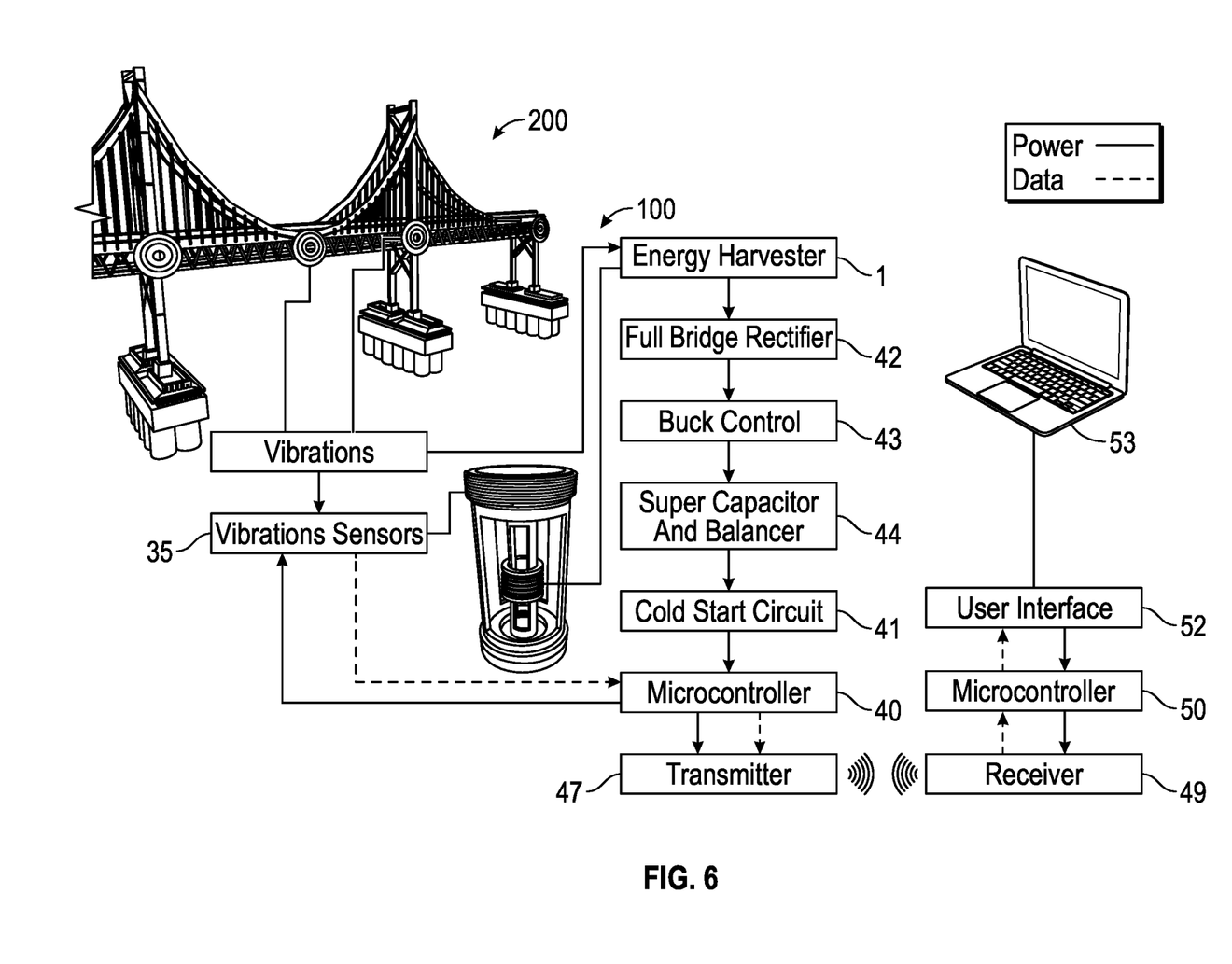
FIG. 6 is a schematic representation of one embodiment of the FIG. 2 energy harvester employed in vibration detection.

As suggested in FIG. 6, one application of the energy harvester described herein is a self-powered wireless vibration-based structural damage detection system 100 for monitoring the health conditions of vehicle traffic structures 200, which may include, as non-limiting examples, on-grade roadways, pier and beam overpasses, truss-supported bridges, and cable-supported bridges. The hardware for this embodiment generally includes a vibration energy harvester-sensor unit, a micro-controller, circuitry, and a wireless interface. The harvester-sensor unit consists of two major components: vibration energy harvester 1 and vibration sensor 35. As described above, the harvester includes two (top and bottom) magnets with a third magnet levitated between them. The magnets are arranged in a repulsive configuration with alike poles facing each other and, therefore, the levitated magnet is floating between the top and bottom magnets. The bottom magnet is fixed while the top magnet is glued to, and guided by, a mechanical spring.

When subject to external vibrations, first, the levitated magnet moves inside the harvester's coils, thus, converting the kinetic energy in these oscillations into electric power that is used to operate the system shown in FIG. 6. Second, dynamic displacement is induced in the planar spring and the top magnet as a result of these excitations. Induced vibrations are detected by a micro-controller 40 as electric signal (voltage) output from the sensor's coil. Thus, in this embodiment, the top magnet vibrating in the second coil windings acts as the vibration sensor 35.

The microcontroller unit (MCU) 40 that is connected to the transmitter 47 shown in FIG. 6 is powered by a cold start circuit 41 that receives the AC/DC converted energy from a full bridge rectifier 42. The MCU performs a 10-bit resolution analog to digital conversion of the sensor data which is then transmitted through a low power AM radio frequency transmitter 47. The process of operation is initialized when induced vibrations from traffic on a bridge takes place. The kinetic energy in those vibrations are then transferred into the levitating magnet in the energy harvester. The alternating current is then converted into direct current using a full bridge rectifier 42 which in turn is stored up in a dual cell supercapacitor 44. Based on the available stored energy, the buck control circuit 43 will regulate the voltage needed to power the microcontroller 40, sensor 35, and transmitter 47. When a setup threshold voltage is reached, the cold start circuit 41 (i.e., a supervisory voltage monitor which does not go into sleep mode) turns on microcontroller 40 from a sleep mode state to allow data from the sensor 35 to be sampled and transmitted wirelessly. This process allows for ultra-low power consumption and maximum power transfer to the circuit load components.

In this embodiment, ambient vibrations induced by traffic, wind, micro-earthquakes, etc., are used for two purposes. First, these vibrations are converted into useful electric power through the energy harvester. Second, these vibrations are detected as an electric signal (voltage) by the sensor and transmitted wirelessly to receiver 49 (including onboard microprocessor 50), which in turn communicates with the user interface 52. In the illustrated embodiment, user interface 52 is the conventional workstation (PC) 53. Collected data is then analyzed through a dynamic displacement monitoring software. The monitoring software may be developed using MATLAB Graphical User Interface (GUI) in order to extract useful information from the collected vibration signal, including maximum displacement amplitude, frequency, and damping information. The extracted information is then compared against pre-safety threshold in order to determine the structural health of the traffic structure being monitored.

Although the Figures show energy harvester 1 being used in conjunction with a sensor (e.g., the upper or second coil winding), other embodiments could use the energy harvester without the upper coil windings and simply for supplying power to independent electronics in a vibration-rich environment. Table 1 shows the results of an experimental comparison between a prior art energy harvester according to FIG. 1A ("Traditional") and the energy harvester of FIGS. 2-5 (Enhanced Energy Harvester—EEH). The designations "EEH-a," "EEH-b," and "EEH-c" represent alternative devices using the different planar springs seen in FIG. 5B.

TABLE 1

| Base excitation (g) (m/s$^2$) | Normalized Power [mW/cm$^3$ g$^2$] | | | |
|---|---|---|---|---|
| | Traditional | EEH-a | EEH-b | EEH-c |
| 0.1 | 0.034 | 0.226 | 0.503 | 1.35 |
| 0.2 | 0.360 | 1.13 | 0.640 | 1.75 |
| 0.3 | 0.607 | 1.14 | 1.018 | 1.92 |
| 0.4 | 0.500 | 0.920 | 1.035 | 1.97 |
| 0.5 | 0.529 | 0.891 | 0.974 | 1.55 |

The base excitation was between 0.1 and 0.5 g. It can be seen that in each case, the EEH generated significantly greater normalized power output or energy density. Thus, certain embodiments of the present invention related to an energy harvester having a normalized energy density of at least 0.75 mW/cm$^3$ g$^2$, with other embodiments having normalized energy density of at least any values between 0.75 and 2.0 mW/cm$^3$ g$^2$.

Although there is no inherent limitation on the size of the energy harvester, more preferred embodiment should be readily portable, i.e., the casing would have a volume of less than 5 cubic feet (e.g., less than 4, 3, 2, 1, 0.5, 0.25, 0.1, 0.05, or 0.01 cubic feet). The term "about" will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or even possibly as much as +/−20%. Similarly, "substantially" will typically mean at least 85% to 99% of the characteristic modified by the term. For example, "substantially all" will mean at least 85%, at least 90%, or at least 95%, etc.

While preferred embodiments of the present disclosure have been described, it is to be understood that the embodiments described are illustrative only and that the scope of the invention is to be defined solely by the appended claims when accorded a full range of equivalents, including many variations and modifications naturally occurring to those skilled in the art from a perusal hereof.

The invention claimed is:

1. A magnetic spring based energy harvester comprising:
   (a) a casing;
   (b) a magnet guide positioned within the casing;
   (c) a first retained magnet approximate one end of the magnet guide;
   (d) a second retained magnet approximate an opposite end of the magnetic guide, wherein the second retained magnet is retained in place by a spring assembly allowing movement of the second retained magnet away and toward the magnet guide;
   (e) a levitated magnet positioned to travel along the magnet guide between the first and second retained magnets;
   (f) a first conductive coil winding circumscribing the magnet guide; and
   (g) a second conductive coil winding at least partially circumscribing the second retained magnet.

2. The energy harvester of claim 1, wherein the spring assembly includes a planar spring.

3. The energy harvester of claim 1, wherein the spring assembly has a nonlinear spring constant.

4. The energy harvester of claim 2, wherein the planar spring is formed substantially of a glass fiber epoxy laminate.

5. The energy harvester of claim 2, wherein the planar spring includes at least two concentric discs of material with at least two attachment points connecting the discs, but a majority of a shared circumference between the concentric discs being unattached.

6. The energy harvester of claim 1, wherein a travel range of the levitating magnet maintains at least a portion of the levitating magnet within the first conductive coil winding.

7. The energy harvester of claim 6, wherein the travel range of the levitating magnet maintains at least 80% of the levitating magnet within the first conductive coil winding.

8. The energy harvester of claim 7, wherein a travel range of the second retained magnet maintains at least 80% of the second retained magnet within the second conductive coil winding.

9. The energy harvester of claim 1, wherein the spring assembly has a spring constant of between 200 and 455 N/m when the second retained magnet is oscillating between a frequency of between 1 and 10 Hz and an acceleration of between 0.1 and 1.0 g.

10. The energy harvester of claim 1, wherein the energy harvester has an energy density of at least 0.75 mW/cm$^3$ g$^2$.

11. The energy harvester of claim 1, wherein the levitated magnet has a mass of 3 to 5 times greater than the mass of the second retained magnet.

12. The energy harvester of claim 1, wherein the levitated magnet is free from attachment to any structure outside the magnet guide.

13. A method of monitoring a vehicle traffic structure, the method comprising the step of positioning a plurality of self-powered vibration sensor units along the vehicle traffic structure, each of the self-powered vibration sensor units comprising:
   (a) a power generator/harvester including:
      (i) a casing;
      (ii) a magnet guide positioned within the casing;
      (iii) a first retained magnet on one end of the magnet guide;
      (iv) a second retained magnet on an opposite end of the magnetic guide, wherein the second retained magnet is retained in place by a spring assembly allowing movement of the second retained magnet away and toward the magnet guide;
      (v) a levitated magnet positioned within the magnet guide;
      (vi) a first conductive coil winding circumscribing the magnet guide;
      (vii) a second conductive coil winding at least partially circumscribing the second retained magnet;
   (b) a sensor element receiving power directly or indirectly from the generator/harvester and detecting vibration in the traffic structure;
   (c) a controller receiving power directly or indirectly from the generator/harvester and receiving data from the sensor element; and
   (d) a wireless transmitter receiving sensor data from the controller.

14. The method of claim 13, wherein the vehicle traffic structure is an on-grade roadway, a pier and beam overpass, a truss-supported bridge, or a cable-supported bridge.

15. The method of claim 13, wherein the spring assembly includes a planar spring.

16. The method of claim 13, wherein the spring assembly has a spring constant of between 200 and 455 N/m.

17. The method of claim 13, wherein a travel range of the levitating magnet maintains at least a portion of the levitating magnet within the first conductive coil winding.

18. The method of claim 13, wherein the power generator/harvester has an energy density of at least 0.75 mW/cm$^3$g$^2$.

19. The method of claim 13, wherein the levitated magnet is free from attachment to any structure outside the magnet guide.

20. A magnetic spring based energy harvester comprising:
   (a) a casing;
   (b) a first retained magnet and a second retained magnet positioned within the casing;
   (c) a levitated magnet positioned between the first and second retained magnets;
   (d) a spring assembly connected to the casing and the second retained magnet, the spring assembly configured to allow limited movement of the second retained magnet toward and away from the levitated magnet; and
   (e) a first conductive coil winding positioned around the levitated magnet such that movement of the levitated magnet induces a current in the coil winding.

* * * * *